Figure 1:
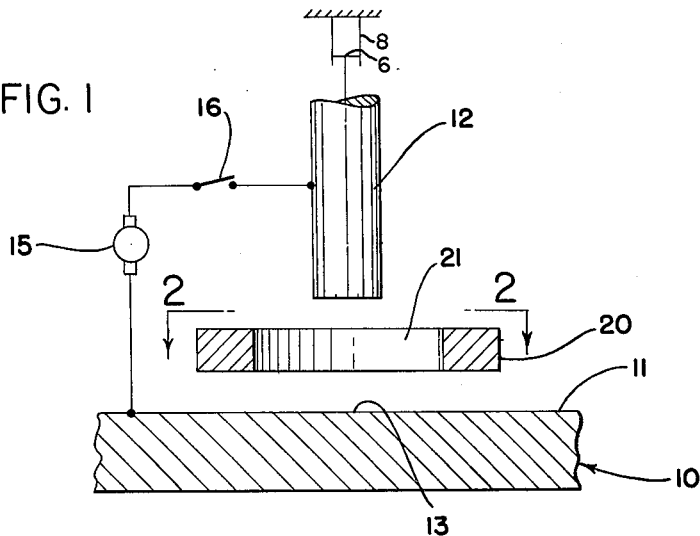

INVENTOR.
RICHARD A. SOMMER

BY Tilberry and Body

ATTORNEYS

United States Patent Office 3,197,609
Patented July 27, 1965

3,197,609
METHOD AND APPARATUS FOR STUD WELDING
Richard A. Sommer, Parma, Ohio, assignor to The Ohio Crankshaft Company, Cleveland, Ohio, a corporation of Ohio
Filed Nov. 20, 1962, Ser. No. 238,860
3 Claims. (Cl. 219—99)

This invention pertains to the art of stud welding and more particularly to an improved apparatus and method for the arc welding of a metallic stud to another metallic member or workpiece.

Heretofore in the art of stud welding, the stud, electrically energized relative to the workpiece, is brought into close proximity therewith and current is caused to flow between the two members. This current rapidly heats both the stud and the workpiece to the fusion temperature whereupon the electric power is turned off and the stud is pressed into firm contact with the workpiece and held there until the molten metal has solidified. Because the heating in this type of operation is so rapid, very steep temperature gradients are set up both in the stud and in the workpiece such that when the electric power is turned off the heated area is very rapidly cooled by flow of heat to the surrounding mass of unheated metal and a quenching effect results. Such quenching tends to produce brittleness and cracks in the metal. Heretofore it has been necessary to limit stud welding to non-quench hardenable metals.

Various attempts have been made in the past to circumvent this problem by using a longer period in which the current flows so as to heat a greater area of the workpiece and a greater length of the stud. Such a method has not been particularly successful because of the excessive power demand and the excessive burn off of the stud. Also the increased time period substantially decreases the productivity of the method.

It has also been proposed to separately pre-heat the stud and the workpiece but this arrangement has proved of limited value because it is difficult to coordinate the heating of the two members and because of the difficulty of handling the pre-heated members.

The present invention contemplates an improved method and apparatus which overcomes all of the above-referred to difficulties and enables stud welding to be accomplished using quench hardenable metals and alloy metals.

In accordance with the present invention a high frequency inductor is positioned so as to simultaneously pre-heat both the workpiece and the stud while the stud is held in close spaced relationship to the workpiece so that when the pre-heating cycle is ended, the stud may be moved into engagement with the workpiece with a minimum time delay and with a minimum amount of cooling.

Further in accordance with the invention a method of stud welding is provided comprising positioning a stud in close spaced relationship to a workpiece, positioning a high frequency inductor coaxially around the site of the weld, flowing high frequency current through the inductor to heat both the workpiece and the stud and then bringing the stud into engagement with the workpiece while flowing a current therebetween and then holding the stud against the workpiece until the metal has hardened.

The principal object of the invention is the provision of a new and improved method and apparatus for stud welding which enables the successful stud welding of quench hardenable metals and of alloy metals.

Figure 2:
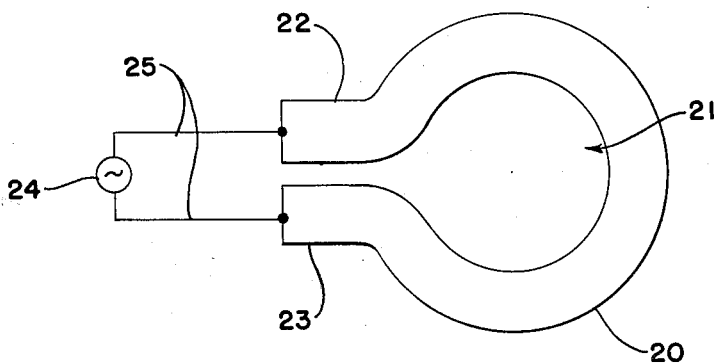

The invention may take physical form at certain parts and arrangements of parts, a preferred embodiment of which will be described in detail in this specification and illustrated in the accompanying drawing which forms a part hereof and wherein:

FIGURE 1 is a side elevational view somewhat schematic of a stud about to be arc welded to a workpiece in combination with a high frequency inductor in heat inducing relationship in accordance with the present invention; and, FIGURE 2 is a top elevational view also somewhat schematic of the high frequency inductor.

Referring now to the drawings wherein the showings are for the purpose of illustrating a preferred embodiment of the invention only and not for the purposes of limiting same, FIGURE 1 shows a metallic workpiece 10 having an upper surface 11 to which a stud 12 is to be welded at the point 13. The stud 12 is electrically energized relative to the workpiece 10 by a suitable power source 15 and the energization is then controlled by means of a switch or contactor 16.

In normal operation the stud 12 is brought into touching contact with the point 13 whereby heavy current flows between the stud 12 and the point 13. This current rapidly heats both the end of the stud 12 and the upper surface of the workpiece 10 at the point 13 by resistance heating so that the stud 12 may be molded to the workpiece.

As will be obvious, this electric resistance heating is extremely rapid and results in very steep temperature gradients, both in the workpiece 10 and in the stud 12. Because of these steep temperature gradients, the moment the current is stopped there is a very rapid conduction of heat away from the weld zone, so rapid in fact that if the metals are of the quench hardenable type, a quench hardening actually results. In many instances this quench hardening is considered extremely detrimental.

In accordance with the present invention a high frequency inductor 20 is provided having a central opening 21 which inductor 20 is located in heat inducing relationship with the surface 11 of the workpiece 10 and with the lower or welding end of the stud 12.

This high frequency inductor 20 may take a number of different forms but in the preferred embodiment is comprised of a single loop of electrically conductive material terminating in fish tail leads 22, 23 which in turn are connected to a source of high frequency energy 24 through power leads 25.

The opening 21 of the inductor 20 will have a diameter somewhat in excess of the diameter of the stud 12 normally on the order of two times or more such that it can both heat the lower end of stud 12 and also heat an appreciable area of the workpiece 10. This inductor, depending upon the power input to the inductor and also the length of time it is allowed to be in heat inducing relationship with the workpiece 10 and the stud 12, raises the temperature of stud 12 and the workpiece 10 to any amount desired below the melting temperature of the metals. Also it will be appreciated that the inductor 20 heats a very appreciable area of the workpiece 10 and a relatively gradual temperature gradient results. This is particularly so because the heating of the inductor is for a greater period of time than the heating by currents between the members and also due to the large area of the workpiece that is heated by the inductor.

The amount of preheat of the workpiece 10 can be controlled by adjusting the spacing of the lower surface of the inductor 20 from the upper surface 11 of the workpiece. Also the amount of heating of the stud 12 can be controlled by positioning the lower end of the stud 12 relative to the upper surface of the inductor 20. In all instances, however, the stud 12 will be located on the axis of the opening 21.

Thus, in operation the inductor 20 is positioned so as to be coaxial with the point 13 and a predetermined distance above the upper surface 11 and the stud 12 is brought into spaced relationship with the point 13 and generally with its lower end above the upper surface of the inductor 20. The distance above the inductor 20 being determined by the amount of preheat desired on the stud 12.

The inductor 20 is then electrically energized from the high frequency power source 24 for a predetermined period of time which has previously been determined either by experiment or calculation, or both.

At the end of this time period the inductor 20 is de-energized.

Either simultaneously with, or just before, or just after the de-energization of the inductor 20, the stud 12 is then moved downwardly by an appropriate mechanism, such as piston 6 in cylinder 8, into touching contact with the point 13 such that a current flow from the power source 15 between the stud 12 and the workpiece 10. The stud 12 is held in this position. This current further heats the lower end of the stud 12 and the upper surface of the workpiece 10 at the point 13. It will be appreciated that because of the preheating which has previously occurred, that the heating will occur with a lower expenditure of electric energy. When the two members have reached the desired temperature, as is generally determined by experiment, switch 16 is opened to de-energize the stud 12 relative to the workpiece 10 and the stud 12 is then pressed into firm contact with the workpiece 10 and held in this position until the metal has cooled.

It will be appreciated that the apparatus for manipulating the stud 12 is conventional in the art and has not been described in detail here.

The present invention has enabled the welding of studs to metals which heretofore could not be stud welded because of the problems of cracking and brittleness resulting from quench hardening due to the quenching action of the mass of unheated metal immediately surrounding the point of weld. With the present invention however, this mass of metal surrounding the point of the weld has been heated to such a temperature that this mass cooling effect does not result and no quench hardening results.

The invention has been described in connection with a preferred embodiment. Obviously, modifications or alterations will occur to others upon a reading and understanding of this specification and it is my intention to include all such modifications and alterations insofar as they come within the scope of the appended claims.

Having thus described my invention, I claim:

1. A method of welding a metal stud having a given diameter to a large area metal workpiece comprising: positioning a metal stud in spaced relationship to the workpiece and aligned with the intended point of the weld between the stud and the workpiece, positioning a high frequency inductor having a diameter substantially greater than the diameter of said stud coaxial with the stud and the point of the weld and in heat inducing relationship with both the workpiece and the end of the stud to be welded, flowing high frequency currents in the inductor to heat both the workpiece and the end of the stud, then, moving the stud into contact with the workpiece at said point, flowing a current between said stud and workpiece to heat the workpiece and the end of the stud and, then, pressing the heated stud into firm engagement with the heated workpiece.

2. An apparatus for electric welding of a metal stud having a given diameter to a metal workpiece comprising means for holding the metal stud in spaced relationship to the workpiece, a high frequency inductor having a central opening aligned with the axis of the stud, said inductor having a diameter substantially greater than the diameter of said stud, means for spacing the inductor from the surface of the workpiece, means for energizing the inductor with a high frequency current and means for moving the stud into resistance heating relationship with the workpiece.

3. An apparatus for welding a metal stud having a given diameter to a metal workpiece including means for positioning the metal stud in spaced relationship to the workpiece, means for moving said stud into contacting relationship with the workpiece and holding said stud in resistance heating relationship therewith and then pressing it against the workpiece, the improvement which comprises a high frequency inductor positioned in said apparatus adjacent the workpiece and of said stud, said inductor having a central opening having a diameter substantially greater than the diameter of said stud, said inductor being aligned with the axis of the stud and means for electrically energizing the high frequency inductor for a predetermined time period.

References Cited by the Examiner

UNITED STATES PATENTS

| | | | |
|---|---|---|---|
| 2,256,480 | 9/41 | Hughes | 219—98 |
| 2,737,566 | 3/56 | Wuppermann | 219—100 |

RICHARD M. WOOD, *Primary Examiner.*